United States Patent [19]

Ivy

[11] 4,351,312

[45] Sep. 28, 1982

[54] PORTABLE CAMPFIRE GRILL ASSEMBLY

[76] Inventor: James R. Ivy, 9001 Glacier, #138, Texas City, Tex. 77590

[21] Appl. No.: 230,544

[22] Filed: Feb. 2, 1981

[51] Int. Cl.³ .................... F24B 3/00; A47G 29/00; F16B 00/00
[52] U.S. Cl. .................................. 126/30; 126/9 R; 126/25 A; 248/125; 403/315
[58] Field of Search ............... 126/9 R, 9 A, 9 B, 30, 126/25 A, 29; 248/125; 297.3; 403/341, 315, 107

[56] References Cited

U.S. PATENT DOCUMENTS

| | | | |
|---|---|---|---|
| 70,368 | 10/1887 | Schultz | 403/341 |
| 2,182,516 | 12/1939 | Coble | 403/380 |
| 2,737,103 | 3/1956 | Renault | 403/315 |
| 2,977,953 | 4/1961 | Dowdy | 126/30 |
| 3,195,531 | 7/1965 | Groff | 126/30 |
| 3,344,780 | 10/1967 | Anderson | 126/30 |
| 3,946,653 | 3/1976 | Pugh | 126/30 |
| 4,083,354 | 4/1978 | Claire | 126/30 |

*Primary Examiner*—Samuel Scott
*Assistant Examiner*—G. Anderson
*Attorney, Agent, or Firm*—Arnold, White & Durkee

[57] ABSTRACT

In accordance with an illustrative embodiment of the present invention, a portable campfire grill assembly includes a support having a flat bracket upper end portion with several side slots cut therein, a handle having a bight with a slot formed in its upper wall adapted to mate with one of the bracket slots when the bight is fitted thereon, and a rectangular lock that is slipped down over the top of the bracket and fitted over the bight to securely lock the handle and bracket to one another.

4 Claims, 3 Drawing Figures

U.S. Patent  Sep. 28, 1982  4,351,312
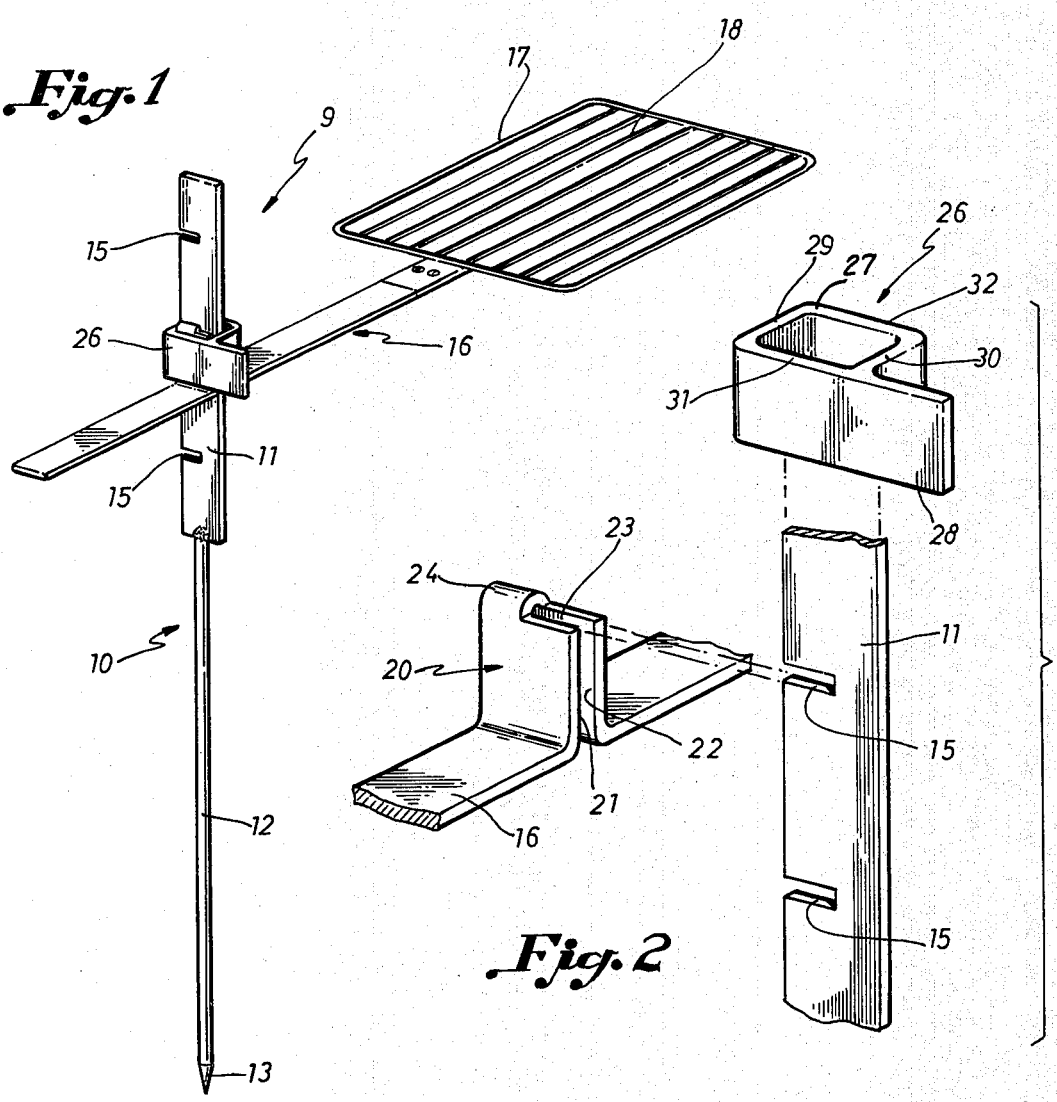
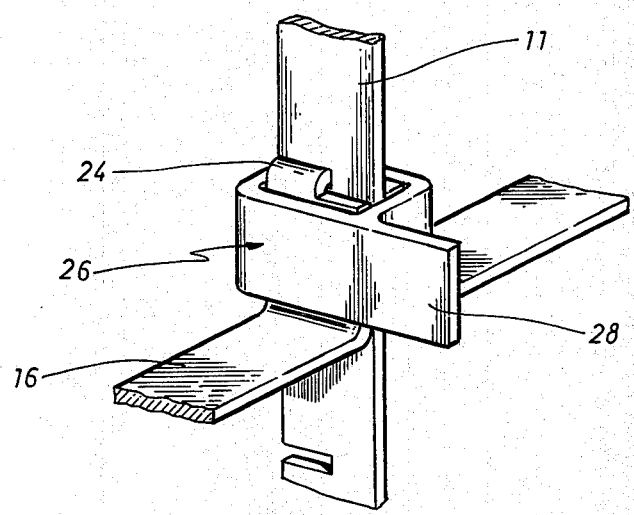

PORTABLE CAMPFIRE GRILL ASSEMBLY

FIELD OF THE INVENTION

This invention relates generally to camping equipment, and specifically to a new and improved lightweight and portable campfire grill that can be readily assembled by the user in a secure and sturdy manner.

BACKGROUND OF THE INVENTION

Numerous grill structures have been proposed for use in outdoor cooking. Most such devices have provision for adjusting the height of the grill above the fire in order to regulate the cooking heat intensity, and various coupling mechanisms such as friction grip slides, lock nuts, notches and stop lugs have been used to secure the grill to an upstanding support. However all such devices that applicant is aware of have various shortcomings. Certain prior devices are heavy and bulky and not suitable for easy transport. Others are not sturdy and can easily be inadvertently knocked down with obvious consequences to the food or drink being prepared, while still other devices are quite complicated and thus costly to manufacture.

It is the general object of the present invention to provide a new and improved campfire grill assembly.

Another object of the present invention is to provide a new and improved portable grill assembly that is lighweight and easy to carry, assemble and disassemble.

Still another object of the present invention is to provide a new and improved portable grill assembly that when assembled is very sturdy and not easily knocked apart.

Yet another object of the present invention is to provide a new and improved portable campfire grill that is economical to manufacture.

SUMMARY OF THE INVENTION

These and other objects are attained in accordance with the concepts of the present invention through the provision of a portable campfire grill apparatus that includes an elongated support having a lower end portion adapted to be driven into the ground, and a flat, generally rectangular upper bracket section having a plurality of horizontally disposed, vertically spaced slots cut in the side thereof. A handle having a grill attached to its outer end is formed with an upstanding bight between its ends, the bight having a slot formed in the upper wall thereof. To assemble the handle and support, the bight is slid laterally onto the bracket section with the respective slots interengaged. Then a rectangular lock ring is slipped over the top of the bracket section and seated in surrounding relation on the bight to rigidly secure the support and handle together.

BRIEF DESCRIPTION OF THE DRAWINGS

The present invention has other features, objects and advantages which will become more clearly apparent in connection with the following detailed description of a preferred embodiment, taken in conjunction with the appended drawings in which:

FIG. 1 is an isometric vie of a portable grill apparatus that is constructed and assembled in accordance with the present invention;

FIG. 2 is an enlarged exploded view of the support, handle and lock bracket; and FIG. 3 is a view similar to FIG. 2 but with the parts assembled together.

DESCRIPTION OF A PREFERRED EMBODIMENT

Referring initially to FIG. 1, a portable campfire grill assembly 9 that is constructed in accordance with the present invention includes an elongated support or standard 10 having a bracket 11 forming its upper section and a rod 12 with a sharpened point 13 forming its lower section. Of course, the point 13 is adapted to be pushed or driven into the ground near the campfire so that the support 10 will be positioned substantially in a vertical orientation. The bracket 11 may be formed of a flat metal plate that is attached to the upper end of the rod 12, and has a plurality of horizontally disposed and vertically spaced slots 15 cut into the side thereof. Each of the slots 15 extends inwardly to a depth that preferably is about one-half the width of the bracket 11.

A handle 16, also formed out of flat metal plate or strap, has its outer end attached to a frame 17 which carries wires 18 or other suitable means to support an article that is to be positioned over the fire. The handle 16 has a width dimension that is approximately equal to that of the bracket 11, and as shown in enlarged detail in FIG. 2, is formed with a bight 20 between the ends thereof. The distance between the inner opposing faces 21 and 22 on the bight 20 is sized to be only slightly larger than the thickness of the bracket section 11. A slot 23 is formed in the upper end wall 24 of the bight 20, and extends inwardly from the side edge thereof preferably a distance of approximately one-half the width of the handle 16.

A lock structure 26 that is adapted to securely fix the handle 16 to the support 10 is constructed by a rectangular section 27 having a tab 28 extending to one side. The section 27 has end walls 29 and 30 that are spaced apart on a slightly greater distance than the width of the handle 16, and side walls 31 and 32 that are spaced apart on a slightly greater distance than the front-to-rear dimension of the bight 20. The height of the rectangular section 27 may be approximately equal to the height of the bight 20.

The support 10, handle 16 and lock 26 can be readily transported as separate components in a backpack or the like. When it is desired to assemble the components adjacent a campfire for cooking purposes, the support 10 first is driven or pushed into the ground adjacent the edge of the fire with the front of the bracket 11 facing the fire. Then the handle 16 with grill 17 atttached is fastened to the bracket 11 by sliding the bight 20 laterally into the bracket with the slot 23 interfitted with one of the slots 15 on the bracket 11 (depending on desired spacing of the grill above the fire), and then slipping the lock 26 over the top of the bracket section 11 and positioning it over the bight 20 as shown in FIG. 3. The walls 21 and 22 of the bight 20 fit snugly against the adjacent walls of the bracket 11 to provide stability in the vertical plane, and the lock section 26 surrounds the assembled bight and bracket to provide lateral stability in the horizontal plane. It will be recognized that it is almost impossible to accidentally bump the handle 16 and thereby dislodge it from the support 10. Of course, the grill assembly can be readily dismantled by simply lifting the lock ring 26 off of the bight 20 and removing it from the bracket to enable sliding the bight 20 off to the side. In like manner, the height of the grill 17 above the fire can be adjusted up or down by lifting the lock ring 26, repositioning the handle 16 to engage the slot 23 with another slot 15, and then repositioning the lock ring 26.

It now will be recognized that a new and improved portable campfire grill assembly has been disclosed. The assembly can be dismantled into its separate components for ease of transport, can be quickly and easily assembled and adjusted at the campfire site, and is very stable in use.

Certain changes and modifications may be made in the disclosed embodiment without departing from the inventive concepts involved. For example, a spade may be secured to the rod 12 above the point 13 to inhibit turning of the assembly with respect to ground. The bracket section 11 may be secured to the rod 12 by a coupling that allows the bracket section to be folded down alongside the rod to reduce the overall length of the support for transport. The grill 17, 18 also may be pivotally or removably secured to the end of the handle 16 for the same purpose. It is contemplated that the grill assembly components may be constructed using a metal such as aluminum that is corrosion resistant and lightweight. Thus, it is the aim of the appended claims to cover all such changes or modifications falling within the true spirit and scope of the present invention.

What is claimed is:

1. A portable campfire grill apparatus comprising: an elongated support having a substantially flat bracket section at its upper end, said bracket section having at least one slot formed in the side thereof; a handle adapted to be attached to a grill, said handle being substantially flat and having an upstanding bight formed intermediate its ends, said bight having a slot formed in the upper wall thereof that is arranged to interfit with the slot in said bracket section; and lock means adapted to be slipped over the top of said bracket section and fitted around said bight to secure said handle to said bracket section.

2. The apparatus of claim 1 wherein said bracket section and said bight have substantially the same width, the respective slots in said bracket section and said bight extending inwardly for a distance that is approximately one-half of said width.

3. The apparatus of claim 2 wherein said bight has side walls that are spaced apart a distance only slightly greater than the thickness of said bracket section.

4. The apparatus of claim 3 wherein said lock means is rectangular in section and sized to fit snugly over said bight.

* * * * *